United States Patent
Cain et al.

(10) Patent No.: US 11,978,880 B2
(45) Date of Patent: May 7, 2024

(54) ELECTROCHEMICAL EXCHANGE FOR THE FABRICATION OF A LAYERED ANODE MATERIAL

(71) Applicant: GM GLOBAL TECHNOLOGY OPERATIONS LLC, Detroit, MI (US)

(72) Inventors: Jeffrey David Cain, Royal Oak, MI (US); Thomas E. Moylan, Troy, MI (US); Leng Mao, Troy, MI (US); Paul Taichiang Yu, Lake Orion, MI (US); Nicholas Paul William Pieczonka, Windsor (CA); Andrew Clay Bobel, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 17/335,972

(22) Filed: Jun. 1, 2021

(65) Prior Publication Data
US 2022/0384773 A1   Dec. 1, 2022

(51) Int. Cl.
*H01M 4/04* (2006.01)
*H01M 4/36* (2006.01)
(Continued)

(52) U.S. Cl.
CPC ....... *H01M 4/0409* (2013.01); *H01M 4/0404* (2013.01); *H01M 4/366* (2013.01);
(Continued)

(58) Field of Classification Search
CPC ............. H01M 4/0409; H01M 4/0404; H01M 4/0438; H01M 4/045; H01M 4/366;
(Continued)

(56) References Cited

U.S. PATENT DOCUMENTS 8,440,350 B1   5/2013   Verbrugge et al.
8,859,144 B2   10/2014  Xiao
(Continued)

FOREIGN PATENT DOCUMENTS

CN   1802733 A    7/2006
CN   107210433 A  9/2017
(Continued)

OTHER PUBLICATIONS

Moylan, Thomas E. et al.; U.S. Appl. No. 17/465,012, filed Sep. 2, 2021, entitled "Methods for Fabricating Two-Dimensional Anode Materials" 49 pages.
(Continued)

*Primary Examiner* — Raymond Alejandro
(74) *Attorney, Agent, or Firm* — Harness, Dickey & Pierce, P.L.C.

(57) ABSTRACT

A method for forming a layered anode material includes contacting a precursor material and a first electrolyte. The precursor material is a layered ionic compound represented by $MX_2$, where M is one of calcium and magnesium and X is one of silicon, germanium, and boron. The method further includes applying a first bias and/or current as the precursor material contacts the first electrolyte to remove cations from the precursor material to create a two-dimensional structure that defines the layered anode material. In certain variations, the method further includes contacting the two-dimensional structure and a second electrolyte and applying a second bias and/or current as the two-dimensional structure contacts the second electrolyte so as to cause lithium ions to move into interlayer spaces or voids created in the two-dimensional structure by the removal of the cations thereby forming the layered anode material.

15 Claims, 6 Drawing Sheets

(51) Int. Cl.
    *H01M 10/0525* (2010.01)
    *H01M 10/0562* (2010.01)
(52) U.S. Cl.
    CPC ... *H01M 10/0525* (2013.01); *H01M 10/0562*
    (2013.01); *H01M 2300/0065* (2013.01)
(58) Field of Classification Search
    CPC .......... H01M 10/0525; H01M 10/052; H01M
    10/0562; H01M 2300/0065
    See application file for complete search history.

(56) References Cited

U.S. PATENT DOCUMENTS

| | | |
|---|---|---|
| 8,999,584 B2 | 4/2015 | Jiang et al. |
| 9,005,811 B2 | 4/2015 | Xiao et al. |
| 9,093,705 B2 | 7/2015 | Xiao et al. |
| 9,142,830 B2 | 9/2015 | Xiao et al. |
| 9,178,208 B2 | 11/2015 | Park et al. |
| 9,302,914 B2 | 4/2016 | Liu et al. |
| 9,362,551 B2 | 6/2016 | Sachdev et al. |
| 9,379,374 B2 | 6/2016 | Liu et al. |
| 9,397,338 B2 | 7/2016 | Park et al. |
| 9,531,004 B2 | 12/2016 | Xiao et al. |
| 9,553,303 B2 | 1/2017 | Park et al. |
| 9,564,639 B2 | 2/2017 | Huang |
| 9,570,752 B2 | 2/2017 | Huang et al. |
| 9,577,251 B2 | 2/2017 | Xiao et al. |
| 9,583,757 B2 | 2/2017 | Park et al. |
| 9,780,361 B2 | 10/2017 | Xiao et al. |
| 9,806,328 B2 | 10/2017 | Park et al. |
| 10,062,898 B2 | 8/2018 | Xiao |
| 11,011,742 B2 | 5/2021 | Sachdev et al. |
| 11,316,142 B2 | 4/2022 | Jiang et al. |
| 11,342,545 B2 | 5/2022 | Cain et al. |
| 11,349,119 B2 | 5/2022 | Halalay et al. |
| 11,374,218 B2 | 6/2022 | Jiang et al. |
| 11,420,139 B2 | 8/2022 | Jiang et al. |
| 2006/0040182 A1 | 2/2006 | Kawakami et al. |
| 2008/0050573 A1 | 2/2008 | Nakano et al. |
| 2012/0251895 A1 | 10/2012 | Mun et al. |
| 2013/0327648 A1 | 12/2013 | Grant et al. |
| 2014/0065488 A1 | 3/2014 | Lee et al. |
| 2014/0295273 A1 | 10/2014 | Mah et al. |
| 2015/0118559 A1 | 4/2015 | Ito et al. |
| 2015/0372297 A1 | 12/2015 | Kameyama et al. |
| 2017/0162859 A1 | 6/2017 | Yang et al. |
| 2017/0179482 A1 | 6/2017 | Verbrugge et al. |
| 2018/0062153 A1 | 3/2018 | Zhu et al. |
| 2018/0083268 A1 | 3/2018 | Huang |
| 2018/0205114 A1 | 7/2018 | Pauric et al. |
| 2018/0248175 A1 | 8/2018 | Ghezelbash et al. |
| 2019/0067675 A1 | 2/2019 | Xiao |
| 2019/0088922 A1 | 3/2019 | Zhamu et al. |
| 2019/0088930 A1 | 3/2019 | Zhamu et al. |
| 2019/0148772 A1 | 5/2019 | Park et al. |
| 2019/0181426 A1 | 6/2019 | Park et al. |
| 2019/0305298 A1 | 10/2019 | Chae et al. |
| 2019/0386314 A1 | 12/2019 | Lanning et al. |
| 2020/0014026 A1 | 1/2020 | Song et al. |
| 2020/0119339 A1 | 4/2020 | Halalay et al. |
| 2020/0350558 A1 | 11/2020 | Jimenez et al. |
| 2020/0388825 A1 | 12/2020 | Verbrugge et al. |
| 2021/0050597 A1 | 2/2021 | Lin et al. |
| 2021/0057752 A1 | 2/2021 | Jiang et al. |
| 2021/0078012 A1 | 3/2021 | Kochhar et al. |
| 2021/0083264 A1 | 3/2021 | Jiang et al. |
| 2021/0135194 A1 | 5/2021 | Wang et al. |
| 2021/0175486 A1 | 6/2021 | Cain et al. |
| 2021/0218016 A1 | 7/2021 | Chae et al. |
| 2022/0029156 A1* | 1/2022 | Thackeray ........ H01M 10/0525 |
| 2022/0384773 A1 | 12/2022 | Cain et al. |
| 2022/0384774 A1 | 12/2022 | Cain et al. |
| 2022/0384776 A1 | 12/2022 | Cain et al. |
| 2023/0060634 A1 | 3/2023 | Moylan et al. |
| 2023/0101215 A1 | 3/2023 | Yu et al. |

FOREIGN PATENT DOCUMENTS

| | | |
|---|---|---|
| CN | 107431192 A | 12/2017 |
| CN | 109994717 A | 7/2019 |
| CN | 110024048 A | 7/2019 |
| CN | 110600688 A | 12/2019 |
| CN | 111048747 A | 4/2020 |
| CN | 112928241 A | 6/2021 |
| CN | 115440945 A | 12/2022 |
| CN | 115440947 A | 12/2022 |
| CN | 115440970 A | 12/2022 |
| CN | 115744918 A | 3/2023 |
| CN | 115881946 A | 3/2023 |
| DE | 102019115818 A1 | 4/2020 |
| DE | 102020129335 A1 | 6/2021 |
| DE | 102022108412 A1 | 12/2022 |
| DE | 102022108463 A1 | 12/2022 |
| DE | 102022108466 A1 | 12/2022 |
| DE | 102022119823 A1 | 3/2023 |
| DE | 102022120235 A1 | 3/2023 |
| WO | WO-2020009494 A1 | 1/2020 |

OTHER PUBLICATIONS

Paul Taichiang Yu et al.; U.S. Appl. No. 17/486,378, filed Sep. 27, 2021, entitled "Solid-State synthesis for the Fabrication of a Layered Anode Material"; 46 pages.

First Office Action for Chinese Patent Application No. 202211046787.6 dated Dec. 1, 2023, with correspondence from China Patent Agent (H.K.) Ltd. summarizing Office Action; 12 pages.

Efficient Synthesis of Orthorhombic Lithium Borate Hydroxide Micro Rods and Their Thermal Conversion to Lithium Borate, Wancheng Zhu, Liyun Zhang, Xiii Cui, Qiang Zhang, (Year: 2011).

Wolfenstine, J. "CaSi2 as an anode for lithium-ion batteries." Journal of power sources 124.1 (2003): 241-245. (Year: 2003).

Castillo, Sarah M ., et al. "Lattice dynamics of the rhombohedral polymorphs of CaSi2." Inorganic Chemistry 55.20 (2016): 10203-10207. (Year: 2016).

Y. Tzeng et al Nanomaterials, 10, (2020) 2467, 1-13. (Year: 2020).

Assresahegn, Birhanu Desalegn et al., "Effects of the Formulations of Silicon-Based Composite Anodes on their Mechanical, Storage, and Electrochemical Properties," <i>ChemSusChem</i>, 2017, 10, pp. 4080-4089, Published online: Sep. 25, 2017, DOI: 10.1002/cssc.201701281.

Cao, Peng-Fei et al., "Superstretchable, Self-Healing Polymeric Elastomers with Tunable Properties," <i>Adv. Funct. Mater.</i>, 2018, 28, 1800741, 9 pages, Published online: Apr. 16, 2018, DOI: 10.1002/adfm.201800741.

Cheng, Yong et al., "Influence of copper addition for silicon-carbon composite as anode materials for lithium ion batteries," <i>RSC Adv.</i>, 2016, 6, pp. 56756-56764, Published online: Jun. 8, 2016, DOI: 10.1039/c6ra12332e.

Choi, Min-Jae et al., "Novel strategy to improve the Li-storage performance of micro silicon anodes," <i>Journal of Power Sources</i>, 2017, 348, pp. 302-310, Published online Mar. 10, 2017, DOI: 10.1016/j.jpowsour.2017.03.020.

Gómez-Cámer, Juan Luis et al., "Anchoring Si nanoparticles to carbon nanofibers: an efficient procedure for improving SI performance in Li batteries," <i>J. Mater. Chem. </i>, 2011, 21, pp. 811-818, Published Nov. 8, 2010, DOI: 10.1039/c0jm01811b.

Hassan, Fathy M. et al., "Engineered Si Electrode Nanoarchicture: A Scalable Postfabrication Treatment for the Production of Next-Generation Li-Ion Batteries," <i>Nano Lett.</i>, 2014, 14, pp. 277-283, Published Dec. 12, 2013, DOI: 10.1021/nl403943g.

Huang, Xingkang et al., "Improved Cyclic Performacne of Si Anodes for Lithium-Ion Batteries by Forming Intermetallic Interphases between Si Nanoparticles and Metal Microparticles," <i>ACS Appl. Mater. Interfaces</i>, 2013, 5, pp. 11965-11970, Published Oct. 21, 2013, DOI: 10.1021/am403718u.

Jeong, You Kyeong et al., "Mussel-Inspired Coating and Adhesion for Rechargeable Batteries: A Review," <i>ACS Appl. Mater. Interfaces</i>, 2018, 10, pp. 7562-7573, Published online: Sep. 22, 2017, DOI: 10.1021/acsami.7b08495.

(56) References Cited

OTHER PUBLICATIONS

Jia, Haiping et al., "A novel approach to synthesize micrometer-sized porous silicon as a high performance anode for lithium-on batteries," *Nano Energy*, 2018, 50, pp. 589-597, Published online: May 21, 2018, DOI: 10.1016/j.nanoen.2018.05.048.

Joyce, Christopher et al., "Metallic Copper Binders for Lithium-Ion Battery Silicon Electrodes," *Journal of the Electrochemical Society*, 2012, 159 (6), pp. A909-A914, Published May 2, 2012, DOI: 10.1149/2.107206jes.

Kim, Donghyuk et al., "Freestanding silicon microparticle and self-healing polymer composite design for effective lithiation stress relazation," *J. Mater. Chem. A*, 2016, 6, pp. 11353-11361, Publsihed Jun. 4, 2018, DOI: 10.1039/c7ta11269f.

Kim, Jae Woo et al., "Improvement of silicon powder negative electrodes by copper electroless deposition for lithium secondary batteries," *Journal of Power Sources*, 2005, 147, pp. 227-233, Published online: Feb. 25, 2005, DOI: 10.1016/j.jpowsour.2004.12.041.

Leblanc, Dominic et al., "Silicon as anode for high-energy lithium ion batteries: From molten ingot to nanoparticles," *Journal of Power Sources*, 2015, 299, pp. 529-536, Published online: Sep. 21, 2015, DOI: 10.1016/j.powsour.2015.09.040.

Lestriez, B. et al., "Hierarchical and Resilient Conductive Network of Bridged Carbon Nanotubes and Nanofibers for High-Energy Si Negative Electrodes," *Electrochemical and Solid-State Letters*, 2009, 12, 4, pp. A76-A80.

Lu, Zhenda et al., "Nonfilling Carbon Coaring of Porous Silicon Micrometer-Sized Particles for High-Performacne Lithium Battery Anodes," *ACS Nano*, 2015, 9, pp. 2540-2547, Published online Mar. 4, 2015, DOI: 10.1021/nn505410q.

Mazouzi, Driss et al., "Very High Surface Capacity Observed Using Si Negative Electrodes Embedded in Copper Foam as 3D Current Collectors," *Adv. Energy Mater.*, 2014, 4, 1301718, 13 pages, Published online: Feb. 13, 2014, DOI: 10.1002/aenm.201301718.

Munaoka, Takatoshi et al., "Ionically Conductive Self-Healing Binder for Low Cost Si Microarticles Anodes in Li-Ion Batteries," *Adv. Energy Mater.*, 2018, 8, 1703138, 11 pages, Published online: Feb. 12, 2018, DOI: 10.1002/aenm.201703138.

Polat, B.D. et al., "Improving Si anode Performance by Forming Copper Capped Copper-Silicon Thin Film Anodes for Rechargeable Lithium Ion Batteries," *Electrochimica Acta*, 2015, 170, pp. 63-71, Published online Apr. 25, 2015, DOI: 10.1013/j.electacta.2015.04.131.

Sethuraman, Vijay A. et al., "Increased cycling efficiency and rate capability of copper-coated silicon anodes lin lithium-ion batteries," *Journal of Power Sources*, 2011, 196, pp. 393-398, Published online Jun. 23, 2010, DOI: 10.1016/j.powsour.2010.06.043.

Wang, Chao et al., "Self-healing chemistry enables the stable operation of silicon microparticle anodes for high-energy lithium-ion batteries," *Nature Chemistry*, 2013, 5, pp. 1042-1048, Published online Nov. 17, 2013, DOI: 10.1038/nchem.1802.

Wang, Jing et al., "Encapsulating micro-nano Si/SiO$_x$.into conjugated nitrogen-doped carbon as binder-free monolithic anodes for advanced lithium ion batteries," *Nanoscale*, 2015, 7, pp. 8023-8034, Published Mar. 23, 2015, DOI: 10.1039/5nr01209k.

Yoon, Sukeun et al., "Enhancement of capacity of carbon-coated Si—Cu$_3$Si composite anode using metal-organic compound for lithium-ion batteries," *Journal of Power Sources*, 2006, 161, pp. 1319-1323, Published online: Jul. 24, 2006, DOI: 10.1016/j.jpowsour.2006.06.035.

\* cited by examiner

ELECTROCHEMICAL EXCHANGE FOR THE FABRICATION OF A LAYERED ANODE MATERIAL

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

Many different materials may be used to create components for a lithium ion battery. For example, positive electrode materials for lithium batteries typically comprise an electroactive material which can be intercalated with lithium ions, such as lithium-transition metal oxides or mixed oxides, for example including $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or one or more phosphate compounds, for example including lithium iron phosphate or mixed lithium manganese-iron phosphate. The negative electrode typically includes a lithium insertion material or an alloy host material. For example, typical electroactive materials for forming an anode include graphite and other forms of carbon, silicon and silicon oxide, tin and tin alloys.

Certain anode materials have particular advantages. While graphite having a theoretical specific capacity of 372 $mAh \cdot g^{-1}$ is most widely used in lithium-ion batteries, anode materials with high specific capacity, for example high specific capacities ranging about 900 $mAh \cdot g^{-1}$ to about 4,200 $mAh \cdot g^{-1}$, are of growing interest. For example, silicon has the highest known theoretical capacity for lithium (e.g., about 4,200 $mAh \cdot g^{-1}$), making it an appealing materials for rechargeable lithium ion batteries. However, anodes comprising silicon may suffer from drawbacks. For example, excessive volumetric expansion and contraction (e.g., about 400% for silicon as compared to about 10% for graphite) during successive charging and discharging cycles. Such volumetric changes may lead to fatigue cracking and decrepitation of the electroactive material, as well as pulverization of material particles, which in turn may cause a loss of electrical contact between the silicon-containing electroactive material and the rest of the battery cell resulting in poor capacity retention and premature cell failure. This is especially true at electrode loading levels required for the application of silicon-containing electrodes in high-energy lithium-ion batteries, such as those used in transportation applications. Accordingly, it would be desirable to develop high performance electrode materials, particularly comprising silicon and other electroactive materials that undergo significant volumetric changes during lithium ion cycling, and methods for preparing such high performance electrodes materials, for use in high energy and high power lithium ion batteries, that can address these challenges.

SUMMARY

This section provides a general summary of the disclosure, and is not a comprehensive disclosure of its full scope or all of its features.

The present disclosure relates to a layered anode material (for example, a two-dimensional ("2D"), layered silicon allotrope), and methods of forming the same (for example, electrochemical exchange fabrication processes).

In various aspects, the present disclosure provides a method for forming a layered anode material. The method may include removing cations from a precursor material using electrochemical extraction. The precursor material may be a layered ionic compound and removal of the cations may create a two-dimensional structure that defines the layered anode material.

In one aspect, the precursor material may be represented by $MX_2$, where M is one of calcium (Ca) and magnesium (Mg) and X is one of silicon (Si), germanium (Ge), and boron (B).

In one aspect, the precursor material may include alternating layers of M and X.

In one aspect, removing the cations from the precursor material may include contacting the precursor material and an electrolyte, and applying a bias and/or current as the precursor material contacts the electrolyte.

In one aspect, the electrolyte may be a first electrolyte, the bias and/or current may be a first bias and/or current, the layered anode material may a prelithiated anode material, and the method may further include prelithiating the two-dimensional structure. Prelithiating the two-dimensional structure may include contacting the two-dimensional structure and a second electrolyte, and applying a second bias and/or current as the two-dimensional structure contacts the second electrolyte so as to cause lithium ions (Li$^+$) to move into interlayer spaces or voids created by the removal of the cations.

In one aspect, the first electrolyte may be different from the second electrolyte and the first bias and/or current may be different from the second bias and/or current.

In one aspect, the second electrolyte may include a lithium source.

In one aspect, the electrolyte may include a cation compatible salt.

In one aspect, the precursor material may be disposed in an electronically conductive, liquid permeable cage and contacting the precursor material and the electrolyte may include disposing the electronically conductive, liquid permeable cage in the electrolyte.

In one aspect, the electrolyte may be a first electrolyte, the bias and/or current may be a first bias and/or current, after the application of the first bias and/or current the electronically conductive, liquid permeable cage may include the two-dimensional structure, the layered anode material may be a prelithiated anode material, and the method may further include prelithiating the two-dimensional structure. Prelithiating the two-dimensional structure may include contacting the electronically conductive, liquid permeable cage including the two-dimensional structure and a second electrolyte, and applying a second bias and/or current while the electronically conductive, liquid permeable cage including the two-dimensional structure contacts the second electrolyte so as to cause lithium ions (Li$^+$) to move into interlayer spaces or voids created by the removal of the cations.

In one aspect, the precursor material may be disposed on a current collector and contacting the precursor material and the electrolyte may include using one or more rollers to dispose the precursor material and the current collector in the electrolyte.

In one aspect, the electrolyte may be a first electrolyte, the bias and/or current may be a first bias and/or current, and the one or more rollers may be first rollers, after the application of the first bias and/or current, a two-dimensional structure may be disposed on the current collector, the layered anode material may be a prelithiated anode material, and the method may further include prelithiating the two-dimensional structure. Prelithiating the two-dimensional structure may include contacting the two-dimensional structure and current collector and a second electrolyte using one or more second rollers, and applying a second bias and/or current while the two-dimensional structure and current collector contacts the second electrolyte so as to move cause lithium ions (Li$^+$) to into interlayer spaces or voids created by the removal of the cations.

In various aspects, the present disclosure provides a method for forming a layered anode material. The method may include removing cations from a precursor material using electrochemical extraction. The precursor material may be a layered ionic compound and removal of the cations may create a two-dimensional structure that includes a plurality of interlayer spaces or voids as a result of the removal of the cation. The method may further include contacting the two-dimensional structure and an electrolyte, and applying a bias and/or current as the two-dimensional structure contacts the electrolyte so as to cause lithium ions (Li$^+$) to move into the interlayer spaces or voids created by the removal of the cations thereby forming the layered anode material.

In one aspect, the precursor material may be represented by MX$_2$, where M is one of calcium (Ca) and magnesium (Mg) and X is one of silicon (Si), germanium (Ge), and boron (B).

In one aspect, the electrolyte may be a first electrolyte, the bias and/or current may be a first bias and/or current, and removing the cations from the precursor material may include contacting the precursor material and a second electrolyte, and applying a second bias and/or current as the precursor material contacts the second electrolyte.

In one aspect, the precursor material may be disposed in an electronically conductive, liquid permeable cage and contacting the precursor material and the second electrolyte may include disposing the electronically conductive, liquid permeable cage in the second electrolyte, such that contacting the two-dimensional structure and the first electrolyte includes subsequently disposing the electronically conductive, liquid permeable cage in the first electrolyte.

In one aspect, the precursor material may be disposed on a current collector and contacting the precursor material and the second electrolyte may include using one or more first rollers to dispose the precursor material and the current collector in the second electrolyte, and contacting the two-dimensional structure and the first electrolyte may include using one or more second rollers to subsequently dispose the two-dimensional structure and the current collector in the first electrolyte.

In various aspects, the present disclosure provides a method for forming a layered anode material. The method may include contacting a precursor material and a first electrolyte. The precursor material may be a layered ionic compound represented by MX$_2$, where M is one of calcium (Ca) and magnesium (Mg) and X is one of silicon (Si), germanium (Ge), and boron (B). The method may further include applying a first bias and/or current as the precursor material contacts the first electrolyte so as to remove cations from the precursor material creating a two-dimensional structure that includes a plurality of interlayer spaces or voids created by the removal of the cation. The method may also include contacting the two-dimensional structure and a second electrolyte, and applying a second bias and/or current as the two-dimensional structure contacts the second electrolyte so as to cause lithium ions (Li$^+$) to move into the interlayer spaces or voids created by the removal of the cations thereby forming the layered anode material.

In one aspect, the precursor material may be disposed in an electronically conductive, liquid permeable cage and contacting the precursor material and the first electrolyte may include disposing the electronically conductive, liquid permeable cage in the first electrolyte, such that contacting the two-dimensional structure and the second electrolyte includes subsequently disposing the electronically conductive, liquid permeable cage in the second electrolyte.

In one aspect, the precursor material may be disposed on a current collector and contacting the precursor material and the first electrolyte may include using one or more rollers to dispose the precursor material and the current collector in the first electrolyte, and contacting the two-dimensional structure and the second electrolyte may include using one or more second rollers to subsequently dispose the two-dimensional structure and the current collector in the second electrolyte.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
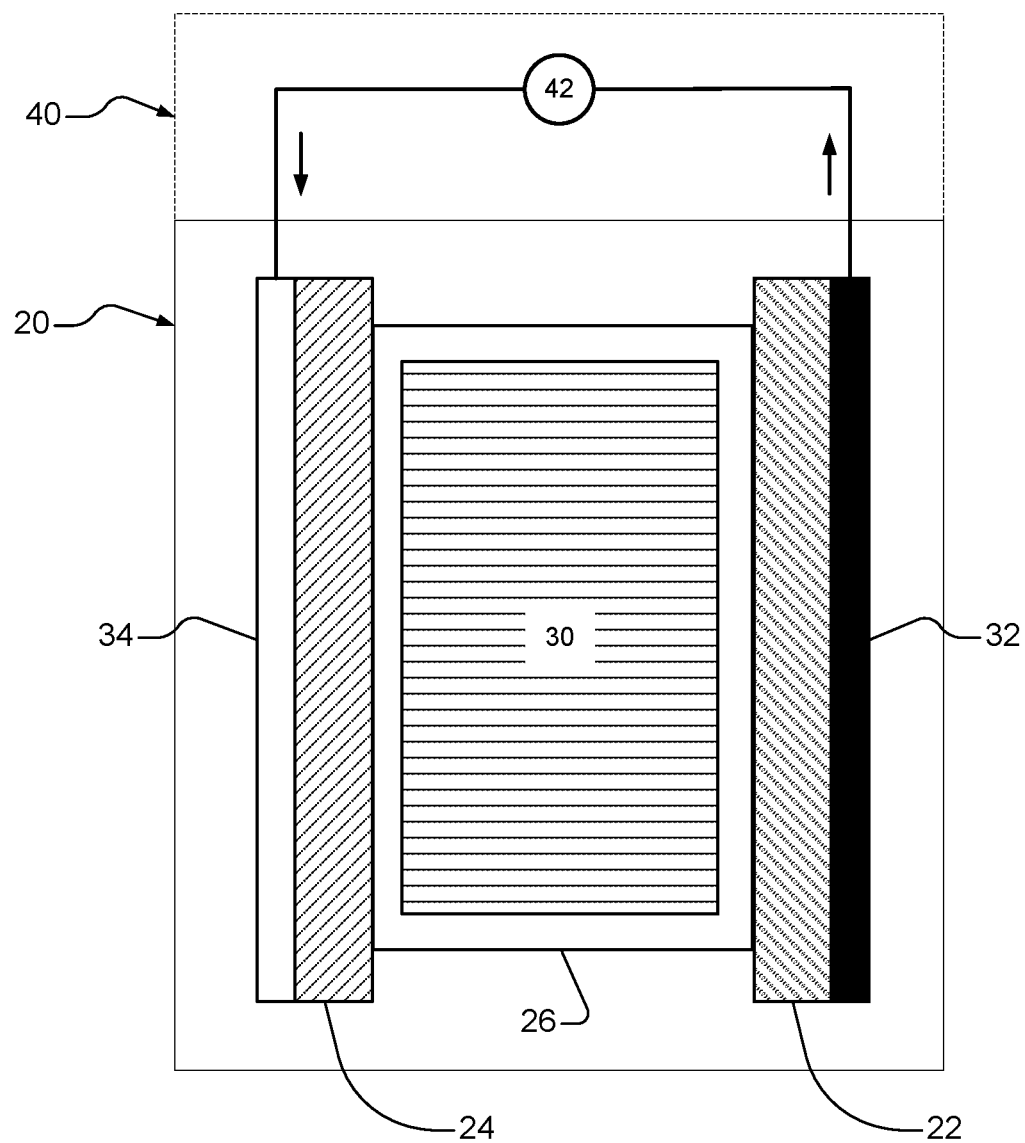
FIG. 1 is a schematic of an example electrochemical battery cell including a layered electroactive material in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure pertains to a layered anode material for an electrochemical cell that cycles lithium ions, and to methods of forming the same. The layered anode material may be a two-dimensional ("2D"), layered silicon allotrope, and in certain variations, the layered anode material may be prelithiated. Methods for forming the layered anode material may include removing cations from a precursor material using an electrochemical exchange process. The precursor material may be an ionic compound (for example, represented by $MX_2$, where M is one of calcium (Ca) and magnesium (Mg) and X is one of silicon (Si), germanium (Ge), and/or boron (B)) that includes alternating layers such that the cations (e.g., $Ca^{2+}$) amenable to electrochemical extraction. For example, the precursor material may include $CaSi_2$, which is a compound including alternating layers of silicon and calcium. When the cations (e.g., $Ca^{2+}$) are removed, a two-dimensional, layered crystal remains. In certain variations, the layered anode material may be prelithiated by moving lithium ions ($Li^+$) into the interlayer spaces or voids created by the removal of the cation using an electrochemical exchange process.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions (or sodium ions in the case of sodium-ion batteries, and the like) and may be in liquid, gel, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single positive electrode cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte. For example, the separator 26 may be defined by a plurality of solid-state electrolyte particles (not shown).

A negative electrode current collector 32 may be positioned at or near the negative electrode 22. The negative electrode current collector 32 may be a metal foil, metal grid or screen, or expanded metal comprising copper or any other appropriate electrically conductive material known to those of skill in the art. A positive electrode current collector 34 may be positioned at or near the positive electrode 24. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries that include solid-state electrolytes and/or solid-state electroactive particles that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of:

alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In various aspects, the porous separator 26 and the electrolyte 30 in FIG. 1 may be replaced with a solid-state electrolyte ("SSE") (not shown) that functions as both an electrolyte and a separator. The solid-state electrolyte may be disposed between the positive electrode 24 and negative electrode 22. The solid-state electrolyte facilitates transfer of lithium ions, while mechanically separating and providing electrical insulation between the negative and positive electrodes 22, 24. By way of non-limiting example, solid-state electrolytes may include $LiTi_2(PO_4)_3$, $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The positive electrode 24 may be formed from a lithium-based active material (or a sodium-based active material in the instance of sodium-ion batteries) that is capable of undergoing lithium intercalation and deintercalation, alloying and dealloying, or plating and stripping, while functioning as the positive terminal of the battery 20. The positive electrode 24 can be defined by a plurality of electroactive material particles (not shown) disposed in one or more layers so as to define the three-dimensional structure of the positive electrode 24. The electrolyte 30 may be introduced, for example after cell assembly, and contained within pores (not shown) of the positive electrode 24. For example, the positive electrode 24 may include a plurality of electrolyte particles (not shown).

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$), lithium manganese-iron phosphate ($LiMn_{2-x}Fe_xPO_4$, where $0<x<0.3$), or lithium iron fluorophosphate ($Li_2FePO_4F$).

In certain variations, the positive electroactive materials may be optionally intermingled with an electronically conducting material that provides an electron conduction path and/or at least one polymeric binder material that improves the structural integrity of the electrode. For example, the positive electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETJEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The positive electrode 24 may include greater than or equal to about 80 wt. % to less than or equal to about 99 wt. % of the positive electroactive material, greater than or equal to about 0 wt. % to less than or equal to about 15 wt. % of the electronically conducting material, and greater than or equal to about 0 wt. % to less than or equal to about 15 wt. %, and in certain aspects, optionally greater than or equal to about 0 wt. % to less than or equal to about 15 wt. %, of the at least one polymeric binder.

The negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, the negative electrode 22 may include a plurality of electrolyte particles (not shown).

The negative electrode 22 includes an electroactive material as a lithium host material capable of functioning as a negative terminal of a lithium ion battery. The electroactive material includes an atomically layered anode material, where each crystallographic plane is considered a layered. The atomically layered anode material may include silicon (Si), germanium (Ge), and/or boron (B). For example, the electroactive material may include a two-dimensional, layered allotrope of silicon (Si), germanium (Ge), and/or boron (B) including planes of atoms strongly bound in-plane and weakly coupled out of plane (i.e., little to no bonding between layers) at an angstrom scale, similar to graphite. In other words, the atomically layered anode material may include silicene, a multi-layered silicene, germanene, a multi-layered germanene, borophene, a multilayer borophene, or any combination thereof. The atomically layered anode material may form micro/nano scale electroactive particles, for example electroactive material particles having an average diameter greater than or equal to about 100 nm to less than or equal to about 50 μm.

Such electroactive materials exhibit improve cyclability, for example, the electroactive materials may have an intrinsic capacity of about 2,000 mAh/g at about 100 mA/g current. The layered structure serves to relieve internal stresses that arise during lithiation and enhance ionic diffusion within the negative electrode 22. For example, as discussed below, the two-dimensional structure may allow lithium to intercalate between the layers via pseudo van der Waals gaps, to store lithium without destroying the lattice structure to avoid pulverization or decrepitation of the structure (similar to intercalation of lithium in graphite). Additionally, the two-dimensional channels formed between layers can better facilitate ionic diffusion to permit faster charge rates.

In various aspects, the negative electroactive material may be a composite include a combination of the layered anode material (e.g., silicene, germanene, and/or borophene), for example in the form of a first plurality of electroactive material particles, and another negative electroactive material, such as graphite, graphene, carbon nanotubes, carbon nanofibers, carbon black, or any combination thereof, for example in the form of a second plurality of electroactive material particles. For example, the composite may include greater than or equal to about 5 wt. % to less than or equal to about 95 wt. % of the layered anode material, and greater than or equal to about 5 wt. % to less than or equal to about 95 wt. % of the other negative electroactive material.

In still further variations, the negative electroactive material may be a composite include a combination of the two-dimensional, layered allotrope (e.g., two-dimensional, layered silicon allotrope for example in the form of a first plurality of electroactive material particles), and a three-dimensional allotrope (e.g., three-dimensional, layered silicon allotrope, such as $SiO_x$ and $Li_xSiO_x$), for example in the form of a second plurality of electroactive material particles. For example, the composite may include greater than or equal to about 5 wt. % to less than or equal to about 95 wt. % of the two-dimensional, layered silicon allotrope, and greater than or equal to about 5 wt. % to less than or equal to about 95 wt. % of the three-dimensional silicon allotrope.

In each instance, the negative electroactive material may be pre-lithiated, prior to (i.e., ex-situ) or after (i.e., in-situ) incorporation into the negative electrode 22 and/or battery 20, so as to compensate for lithium losses during cycling, such as may result during conversion reactions and/or the formation of $Li_xSi$ and/or a solid electrolyte interphase (SEI) layer (not shown) on the negative electrode 22 during the first cycle, as well as ongoing lithium loss due to, for example, continuous solid electrolyte interphase (SEI) formation.

In certain variations, the layered anode material may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETJEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The negative electrode 22 may include greater than or equal to about 10 wt. % to less than or equal to about 99 wt. % of the layered anode material, greater than or equal to about 0 wt. % to less than or equal to about 20 wt. % of the electronically conducting material, and greater than or equal to about 0 wt. % to less than or equal to about 20 wt. %, and in certain aspects, optionally greater than or equal to about 1 wt. % to less than or equal to about 20 wt. %, of the at least one polymeric binder.

In various aspects, the present disclosure provides methods of making a layered anode material (e.g., two-dimensional, layered silicon allotrope) for use in negative electrodes, such as negative electrode 22 illustrated in FIG. 1. For example, the present disclosure contemplates methods of making the layered anode material using an electrochemical exchange process. Methods may generally include using a first bias and/or current to remove cations from a precursor material, forming two-dimensional, layered crystals. In certain variations, methods may also include prelithiating the two-dimensional, layered anode material, for example, by applying a second bias and/or current to a lithium source. In each instance, the methods may be performed using, for example only, batch processes or continuous processes (such as, roll-to-roll processes).

Figure 2:
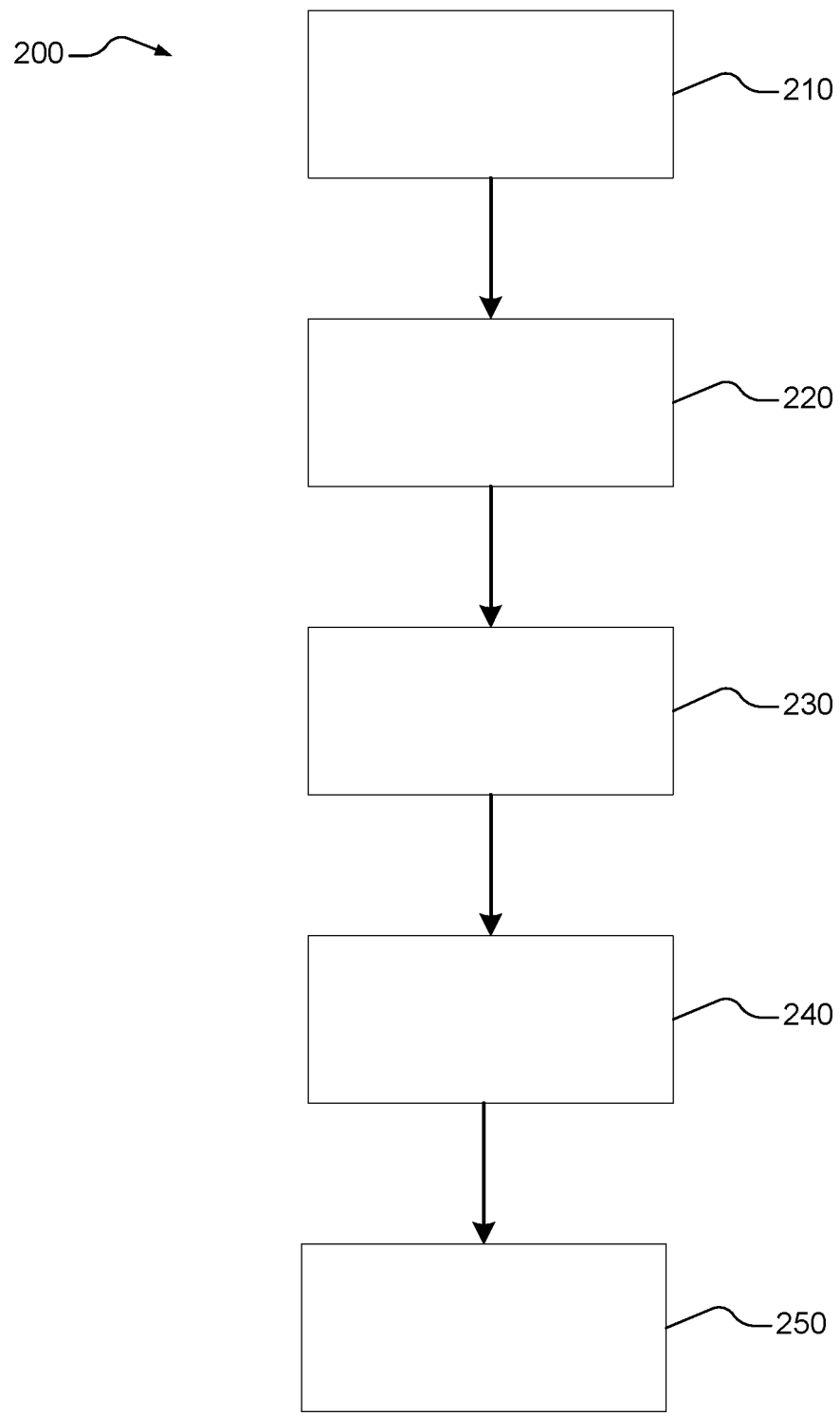
FIG. 2 is a flowchart illustrating an exemplary method for fabricating the layered electroactive material for use in an electrochemical battery cell, like the example electrochemical battery cell illustrated in FIG. 1, and prelithiating the layered electroactive material, in accordance with various aspects of the present disclosure.

FIG. 2 illustrates an exemplary method 200 for forming the layered anode material. The method 200 includes removing 230 cations from a precursor material using a temperature-controlled process. For example, substantially all, or in certain variations, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, optionally greater than or equal to about 99%, or optionally, greater than or equal to about 99.5%, of the cations may be removed 230 from the precursor material. The precursor material may be an ionic compound represented by $MX_2$, where M is one of calcium (Ca) and magnesium (Mg) and X is one of silicon (Si), germanium (Ge), and/or boron (B). In each instance, the precursor material includes alternating layers, such that the cations (e.g., $Ca^{2+}$) are amenable to electrochemical extraction. For example, the precursor material may include $CaSi_2$, which is a compound including alternating atomic layers of silicon and calcium. When the cations (e.g., $Ca^{2+}$) are removed, a two-dimensional, layered crystal remains.

Figure 3A:
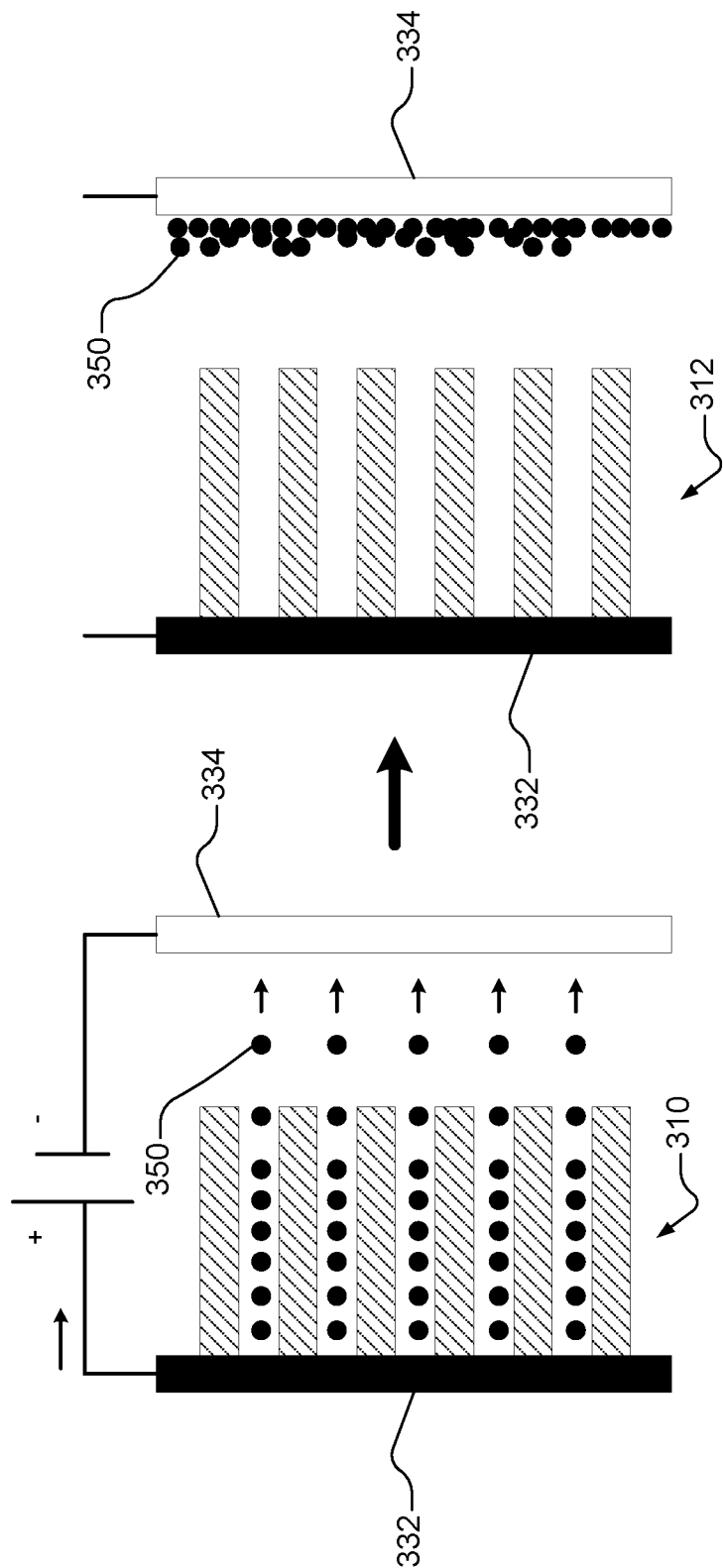
FIG. 3A illustrates an electrochemical exchange process for fabricating the layered electroactive material for use in an electrochemical battery cell, like the example electrochemical battery cell illustrated in FIG. 1, in accordance with various aspects of the present disclosure.

The cations may be removed 230 using an electrochemical exchange process. For example, as illustrated in FIG. 3A, a precursor material 310 may be disposed on or adjacent to a surface of a first current collector 332 (for example, a negative current collector similar to the negative current collector 32 illustrated in FIG. 1). The first current collector 332 may be aligned with a second current collector 334 (for example, a positive current collector similar to the positive current collector 34 illustrated in FIG. 1) and a first bias (i.e., voltage) and/or current may be applied so as to induce movement of cations 350 from the precursor material 300 to the second current collector 334 leaving a two-dimensional, layered anode material 312 on or adjacent to the first current collector 332, which may in certain variations, be disposed in a cell (e.g., battery 20 as illustrated in FIG. 1) as the negative electroactive material.

The first current collector 332 and the precursor material 310 and the second current collector are disposed in a first electrolyte solution. For example, in an example batch process, the first current collector 332 and the precursor material 310 may be disposed in an electronically conductive, liquid permeable cage that is placed into a first electrolyte bath prior to the application of the first bias and/or current. The electronically conductive, liquid permeable cage is configured to retain or hold the precursor material 310, but allows cations to flow or move into and out of the electronically conductive, liquid permeable cage.

In each instance, the first electrolyte solution may include a cation compatible salt in a solvent solution that dissolves (e.g., solvates) the cations and the cation compatible salt. For example, when the precursor material includes calcium, the first electrolyte solution may include 1M calcium tetrafluoroborate hydrate ($Ca(BF_4)_2$) in solvents ethylene carbonate (EC):propylene carbonate (PC) (1:1). When the precursor material 310 includes $CaSi_2$, the electrochemical exchange may be summarized as follows: (1) anode: $xCaSi_2 \rightarrow xCa^{2+} + 2xe^- + 2D\text{-}Si$ and (2) cathode: $Ca^{2+} + 2e^- \rightarrow Ca$.

With renewed reference to FIG. 2, in certain variations, as illustrated, the method 200 may include obtaining or preparing 210 the precursor material and disposing 220 the precursor material on or adjacent to one or more surfaces of a current collector. For example, preparing 210 the precursor material may include grinding the precursor material so to reduce particle size (e.g., to an average particle size diameter of greater than or equal to about 100 nm to less than or equal to about 50 μm) and increase surface area, thereby reducing cationic exchange time and increasing the likelihood of producing a uniformed two-dimensional, layered material.

In certain variations, as illustrated, the method 200 may also include prelithiating the two-dimensional, layered anode material (e.g., decalcinated material), using a temperature-controlled process, to form a lithiated layered material (e.g., $Li_xSi$). Thus, eliminating or reducing the need for possible prelithiating steps in-situ, so as to save the related expense and time.

Figure 3B:
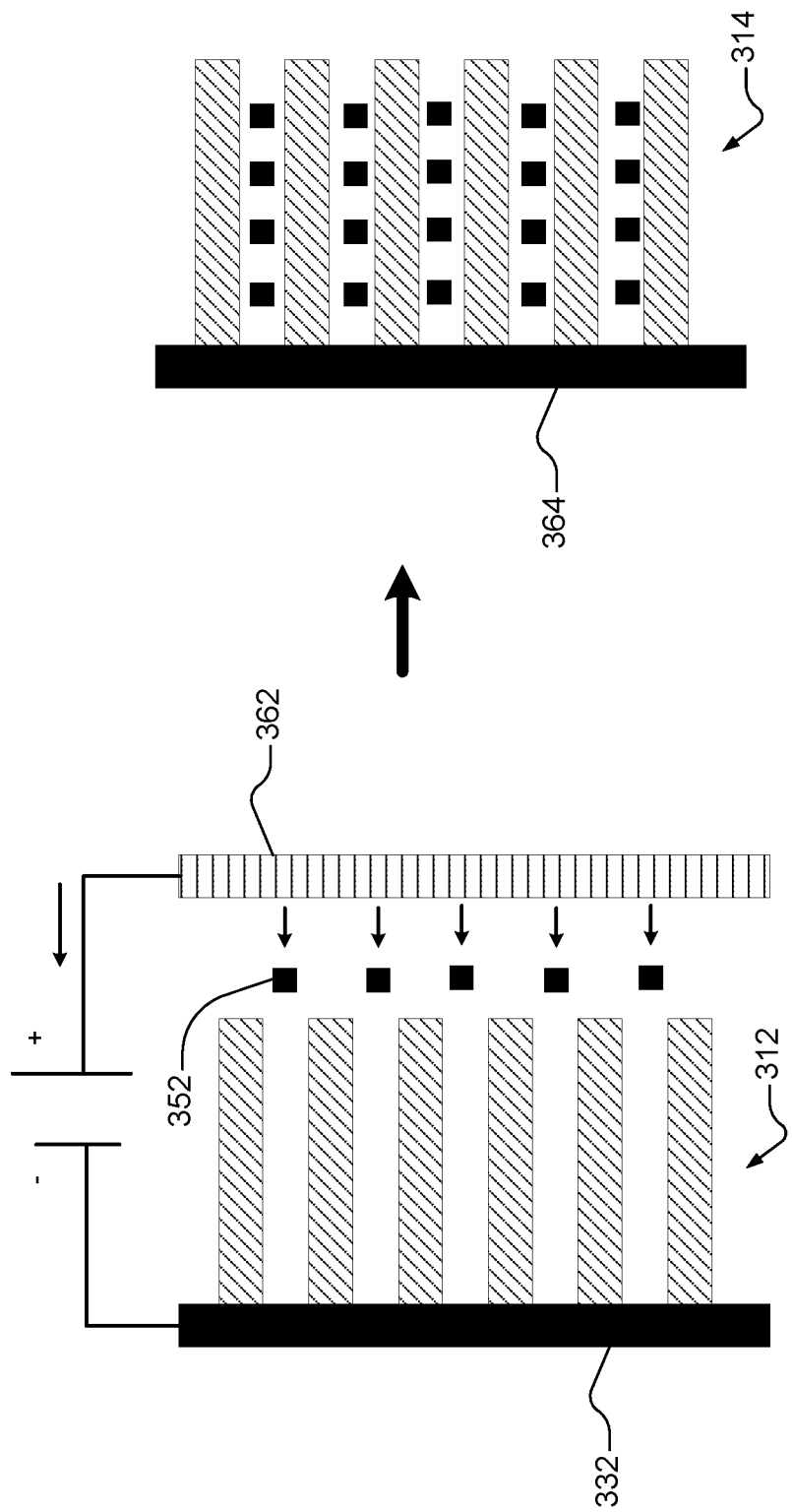
FIG. 3B illustrates an electrochemical exchange process for prelithiating a layered electroactive material, like the layered electroactive material as illustrated in FIG. 3A, in accordance with various aspects of the present disclosure.

Similar to the removal 230 of the cations from the precursor material, prelithiation may occur using an electrochemical process. For example, as illustrated in FIG. 3B, a third current collector 362 (for example, a negative current collector similar to the negative current collector 32 illustrated in FIG. 1) may be aligned with the first current collector 332 and the two-dimensional, layered anode material 312, and a second bias (i.e., voltage) and/or current may be applied such that lithium ions ($Li^+$) 352 moves from the third current collector 332 toward the first current collector 332 to form the prelithiated, layered anode material 314. For example, as illustrated, the lithium ions ($Li^+$) 352 may move into the interlayer spaces or voids created by the removal of the cation. In this manner, the two-dimensional, layered anode material 312 is ideal for re-intercalating and storing lithium ions because the lithium ions is able to fill voids created by the removal of the cation.

The first current collector 332 and the two-dimensional, layered anode material 312 and the third current collector 362 are disposed in a second electrolyte solution. For example, in the example batch process, an electronically conductive, liquid permeable cage including the first current collector 332 and the two-dimensional, layered anode material 312 may be removed from the first electrolyte bath and placed into a second electrolyte bath prior to the application of the second bias and/or current. The first current collector 332 and the prelithiated, layered anode material 314 may be removed from the second electrolyte bath when the desired state of charge is achieved. In each instance, the second electrolyte solution may include, for example only, 1M lithium hexafluorophosphate ($LiPF_6$) in solvents ethylene carbonate (EC):propylene carbonate (PC) (1:1). When the two-dimensional, layered anode material 312 includes silicon, the electrochemical exchange may be summarized as follows: (1) anode: $Li \rightarrow xLi + xe^-$ and (2) cathode: $2D\text{-}Si + xLi + xe^- \rightarrow 2D\text{-}Li_xSi$.

With renewed reference to FIG. 2, in certain variations, as illustrated, the method 200 may include incorporating 250 the two-dimensional, layered anode material (and optionally, the first current collector) and/or the prelithiated, layered anode material (and optionally, the first current collector) into a cell to be used as the negative electroactive material (and negative current collector). Although not illustrated, in various aspects, the method 200 may further include additional coating steps and/or other post-processing steps, for example to enhance air stability of the two-dimensional, layered anode material and/or the prelithiated, layered anode material prior to incorporation into a cell.

Figure 4:
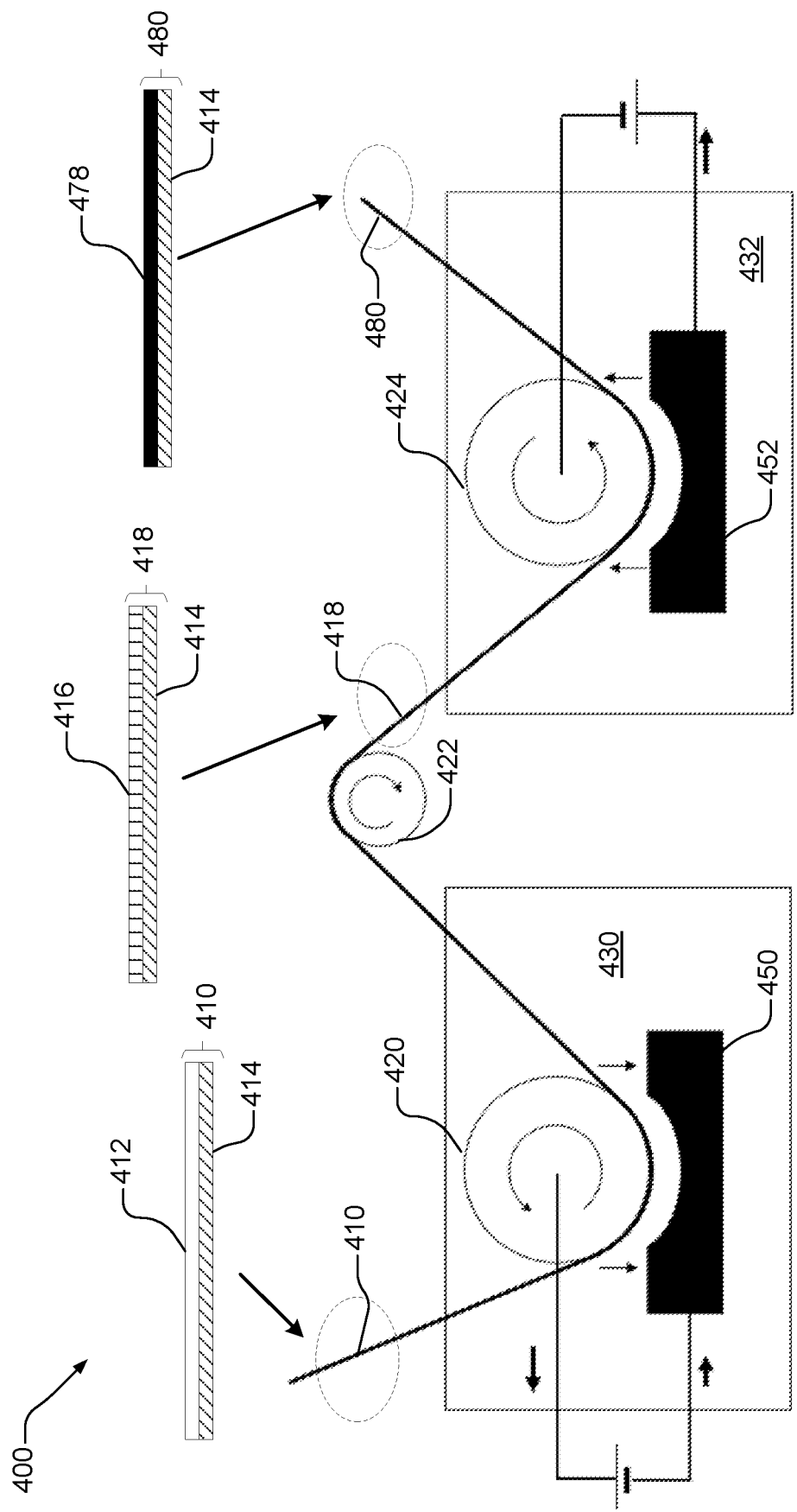
FIG. 4 illustrates an example roll-to-roll process for forming a prelithiated, layered electroactive material for use in an electrochemical battery cell, like the example electrochemical battery cell illustrated in FIG. 1, in accordance with various aspects of the present disclosure.

In various aspects, a layered anode material (e.g., two-dimensional, layered silicon allotrope) for use in negative electrodes, such as negative electrode 22 illustrated in FIG. 1, may be prepared using a continuous process, for example, a roll-to-roll process 400. For example, as illustrated in FIG. 4, the roll-to-roll process 400 may include coating a precursor material 412 on one or more surfaces of a current collector 414 (for example, a negative current collector similar to the negative current collector 32 illustrated in FIG. 1) to form a precursor electrode 410, and moving the precursor electrode 410 through a first electrolyte bath 430 using a first roller 420.

The precursor material 412 includes an ionic compound represented by MX2, where M is one of calcium (Ca) and magnesium (Mg) and X is one of silicon (Si), germanium (Ge), and/or boron (B). As the precursor electrode 410 is moved through the first electrolyte bath 430 a first bias (i.e., voltage) and/or current may be applied, as illustrated. The applied first bias and/or current causes the removal of cations (e.g., $Ca^{2+}$) from the precursor material 412 such that a two-dimensional, layered anode material 416 remains on the current collector 414. As illustrated, the cations may move (e.g., $Ca^{2+}$) from the precursor material 412 to a cation reservoir 450 (e.g., cathode or anode). The first electrolyte bath 430 may include a cation compatible salt in a solvent solution that dissolves (e.g., solvates) the cations and the cation compatible salt. For example, when the precursor material includes calcium, the first electrolyte solution may include 1M calcium tetrafluoroborate hydrate ($Ca(BF_4)_2$) in solvents ethylene carbonate (EC):propylene carbonate (PC) (1:1). A temperature of the first electrolyte bath 430 is controlled. In certain variations, the temperature of the first electrolyte bath 430 may be controlled, for example increased, so as to enhance diffusion.

In certain variations, as illustrated, after the formation of the two-dimensional, layered anode material 416, the roll-to-roll process 400 may further include moving the two-dimensional, layered anode material 416 and current collector 414, using second and third rollers 422 and 424 to a second electrolyte bath 432. As the two-dimensional, layered anode material 416 and current collector 414 moves through the second electrolyte bath 432 the two-dimensional, layered anode material 416 may be prelithiated. For example, similar to the method detailed above, a second bias (i.e., voltage) and/or current may be employed so as to induce lithium ions (Li$^+$) to move from a lithium source 452 toward the two-dimensional, layered anode material 416. The lithium ions (Li$^+$) may move into the interlayer spaces or voids created by the removal of the cation, forming a prelithiated anode material 480. The prelithiated anode material 480 (and optionally the current collector 414) may be incorporated into a cell o be used as the negative electroactive material (and negative current collector). The second electrolyte bath 432 may include, for example only, 1M lithium hexafluorophosphate (LiPF$_6$) in solvents ethylene carbonate (EC):propylene carbonate (PC) (1:1). In certain variations, the temperature of the second electrolyte bath 432 may be controlled, for example increased, so as to enhance diffusion.

Although not illustrated, in various aspects, the roll-to-roll process 400 may further include additional coating steps and/or other post-processing steps, for example to enhance air stability of the two-dimensional, layered anode material and/or the prelithiated, layered anode material prior to incorporation into a cell.

Figure 5:
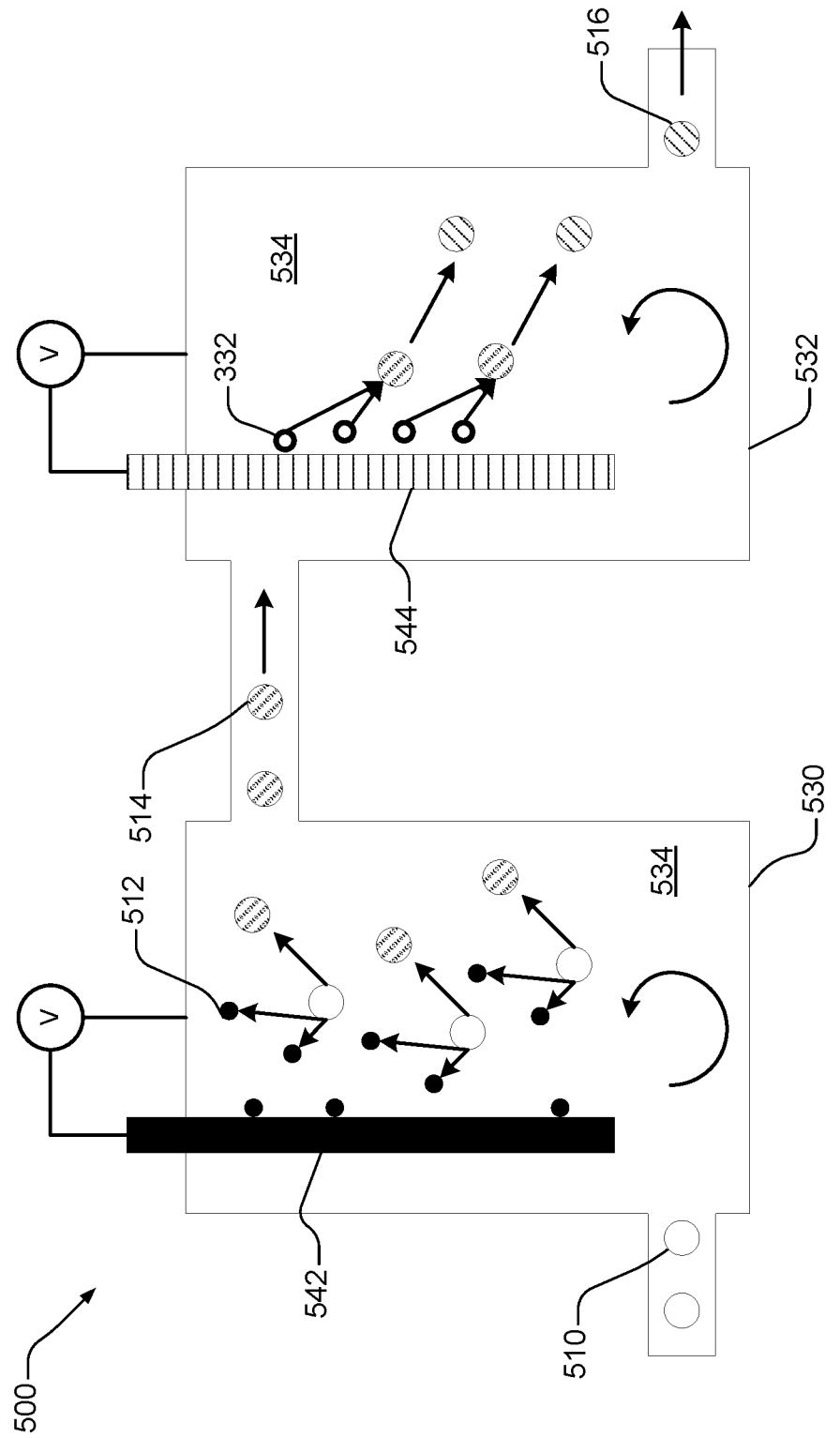
FIG. 5 illustrates an example continuous process for forming a prelithiated, layered electroactive material for use in an electrochemical battery cell, like the example electrochemical battery cell illustrated in FIG. 1, in accordance with various aspects of the present disclosure.

In various aspects, a layered anode material (e.g., two-dimensional, layered silicon allotrope) for use in negative electrodes, such as negative electrode 22 illustrated in FIG. 1, may be prepared using a continuous flow process 500. As illustrated in FIG. 5, the continuous flow process 500 includes moving materials from different compartments or containers (for example, from a first compartment or container 530 to a second compartment or container 532), where each compartment or container includes a different source and bias and/or current. The different compartments or containers (e.g., the first and second containers 530, 532) include a circulating electrolyte solution 534, including one or more lithium salt (such as, calcium tetrafluoroborate hydrate (Ca(BF$_4$)$_2$) and/or lithium hexafluorophosphate (LiPF$_6$)) in a solvent system including, for example only, carbonate (EC) and/or propylene carbonate (PC). Although not illustrated, in certain variations, the first and second containers 530, 532 may include different electrolyte solutions. For example, the first container 530 may include 1M calcium tetrafluoroborate hydrate (Ca(BF$_4$)$_2$) in solvents ethylene carbonate (EC):propylene carbonate (PC) (1:1), and the second container 532 may include 1M lithium hexafluorophosphate (LiPF$_6$) in solvents ethylene carbonate (EC):propylene carbonate (PC) (1:1).

As illustrated, the continuous flow process 500 may include introducing a precursor material 510 into a first container 530. The precursor material 510 may be an ionic powder material represented by MX$_2$, where M is one of calcium (Ca) and magnesium (Mg) and X is one of silicon (Si), germanium (Ge), and/or boron (B). The first container 530 may include a counter electrode 542. A first bias (i.e., voltage) and/or current may be applied such that as the precursor material 510 moves into and through the first container 530 cations 512 are removed from the precursor material 510 (e.g., electrochemically decalcinated) so as to form the two-dimensional, layered allotrope 514. The cations 512 move toward the counter electrode 542, while the two-dimensional, layered allotrope 514 move toward the second container 532, which includes a lithium source (e.g., lithium metal) 544. A second bias (i.e., voltage) and/or current may be applied to the lithium source 544, such that the two-dimensional, layered allotrope 514 is prelithiated (e.g., electrically charged) to form the desired prelithiated anode material 516.

Although not illustrated, in various aspects, the continuous process 500 may further include separating the prelithiated anode material 516 using one or more known filtration or centrifugation methods. In certain variations, the continuous process 500 may further include additional coating steps and/or other post-processing steps, for example to enhance air stability of the two-dimensional, layered anode material and/or the prelithiated, layered anode material prior to incorporation into a cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a layered anode material, the method comprising:

removing cations from a precursor material using electrochemical extraction, the precursor material being a layered ionic compound and removal of the cations creating a two-dimensional structure that defines the layered anode material, the removing of the cations from the precursor material comprising:
contacting the precursor material and a first electrolyte, and
applying a first bias and/or current as the precursor material contacts the first electrolyte; and
prelithiating the two-dimensional structure, the prelithiating of the two-dimensional structure including
contacting the two-dimensional structure and a second electrolyte, and
applying a second bias and/or current as the two-dimensional structure contacts the second electrolyte so as to cause lithium ions (Li$^+$) to move into interlayer spaces or voids created by the removal of the cations.

2. The method of claim 1, wherein the precursor material is represented by MX$_2$, where M is one of calcium (Ca) and magnesium (Mg) and X is one of silicon (Si), germanium (Ge), and boron (B), and the precursor material includes alternating layers of M and X.

3. The method of claim 1, wherein the first electrolyte is different from the second electrolyte and the first bias and/or current is different from the second bias and/or current.

4. The method of claim 1, wherein the second electrolyte comprises a lithium source.

5. The method of claim 1, wherein the precursor material is disposed in an electronically conductive, liquid permeable cage and contacting the precursor material and the electrolyte comprises disposing the electronically conductive, liquid permeable cage in the electrolyte.

6. The method of claim 1, wherein the precursor material is disposed on a current collector and contacting the precursor material and the electrolyte comprises using one or more rollers to dispose the precursor material and the current collector in the electrolyte.

7. The method of claim 1, wherein the precursor material is disposed on a current collector and contacting the precursor material and the electrolyte comprises using one or more rollers to dispose the precursor material and the current collector in the electrolyte.

8. A method for forming a layered anode material, the method comprises:
 removing cations from a precursor material using electrochemical extraction, wherein the precursor material is a layered ionic compound and removal of the cations creates a two-dimensional structure comprising a plurality of interlayer spaces or voids created by the removal of the cation;
 contacting the two-dimensional structure and an electrolyte; and
 applying a bias and/or current as the two-dimensional structure contacts the electrolyte so as to cause lithium ions (Li$^+$) to move into the interlayer spaces or voids created by the removal of the cations thereby forming the layered anode material.

9. The method of claim 8, wherein the precursor material is represented by $MX_2$, where M is one of calcium (Ca) and magnesium (Mg) and X is one of silicon (Si), germanium (Ge), and boron (B).

10. The method of claim 8, wherein the electrolyte is a first electrolyte and the bias and/or current is a first bias and/or current, and wherein removing the cations from the precursor material comprises:
 contacting the precursor material and a second electrolyte, and
 applying a second bias and/or current as the precursor material contacts the second electrolyte.

11. The method of claim 10, wherein the precursor material is disposed in an electronically conductive, liquid permeable cage and contacting the precursor material and the second electrolyte comprises disposing the electronically conductive, liquid permeable cage in the second electrolyte, and
 wherein contacting the two-dimensional structure and the first electrolyte comprises subsequently disposing the electronically conductive, liquid permeable cage in the first electrolyte.

12. The method of claim 10, wherein the precursor material is disposed on a current collector and contacting the precursor material and the second electrolyte comprises using one or more first rollers to dispose the precursor material and the current collector in the second electrolyte, and
 wherein contacting the two-dimensional structure and the first electrolyte comprises using one or more second rollers to subsequently dispose the two-dimensional structure and the current collector in the first electrolyte.

13. The method of claim 10, wherein the precursor material is disposed on a current collector and contacting the precursor material and the first electrolyte comprises using one or more rollers to dispose the precursor material and the current collector in the first electrolyte, and
 wherein contacting the two-dimensional structure and the second electrolyte comprises using one or more second rollers to subsequently dispose the two-dimensional structure and the current collector in the second electrolyte.

14. A method for forming a layered anode material, the method comprises:
 contacting a precursor material and a first electrolyte, wherein the precursor material is a layered ionic compound represented by $MX_2$, where M is one of calcium (Ca) and magnesium (Mg) and X is one of silicon (Si), germanium (Ge), and boron (B);
 applying a first bias and/or current as the precursor material contacts the first electrolyte so as to remove cations from the precursor material creating a two-dimensional structure comprising a plurality of interlayer spaces or voids created by the removal of the cation;
 contacting the two-dimensional structure and a second electrolyte; and
 applying a second bias and/or current as the two-dimensional structure contacts the second electrolyte so as to cause lithium ions (Li$^+$) to move into the interlayer spaces or voids created by the removal of the cations thereby forming the layered anode material.

15. The method of claim 14, wherein the precursor material is disposed in an electronically conductive, liquid permeable cage and contacting the precursor material and the first electrolyte comprises disposing the electronically conductive, liquid permeable cage in the first electrolyte, and contacting the two-dimensional structure and the second electrolyte comprises subsequently disposing the electronically conductive, liquid permeable cage in the second electrolyte.

* * * * *